(12) United States Patent
Miller et al.

(10) Patent No.: US 12,130,772 B2
(45) Date of Patent: Oct. 29, 2024

(54) MULTI-PROCESSOR DEVICE WITH EXTERNAL INTERFACE FAILOVER

(71) Applicant: Rambus Inc., San Jose, CA (US)

(72) Inventors: Michael Raymond Miller, Raleigh, NC (US); Evan Lawrence Erickson, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/971,964

(22) Filed: Oct. 24, 2022

(65) Prior Publication Data

US 2023/0138817 A1   May 4, 2023

Related U.S. Application Data

(60) Provisional application No. 63/272,923, filed on Oct. 28, 2021.

(51) Int. Cl.
*G06F 15/78* (2006.01)
*G06F 21/72* (2013.01)

(52) U.S. Cl.
CPC .......... *G06F 15/7807* (2013.01); *G06F 21/72* (2013.01)

(58) Field of Classification Search
CPC ............................. G06F 15/7807; G06F 21/72
See application file for complete search history.

(56) References Cited

U.S. PATENT DOCUMENTS

| | | | |
|---|---|---|---|
| 9,710,651 B2 | 7/2017 | Stewart et al. | |
| 10,250,595 B2 | 4/2019 | Surdu | |
| 11,029,973 B1 | 6/2021 | Teng | |
| 11,646,868 B2 * | 5/2023 | Fortenberry | H04L 9/0894 |
| | | | 713/171 |
| 2016/0239455 A1 | 8/2016 | Merritt et al. | |
| 2019/0220602 A1 * | 7/2019 | Ruan | G06F 21/64 |
| 2020/0117804 A1 * | 4/2020 | Laffey | H04L 9/0877 |
| 2020/0117814 A1 * | 4/2020 | Ito | G06F 21/79 |
| 2020/0133800 A1 * | 4/2020 | Varadan | G06F 11/1441 |
| 2020/0151336 A1 * | 5/2020 | Maletsky | G06F 21/575 |
| 2021/0124712 A1 | 4/2021 | Ley et al. | |
| 2021/0192050 A1 * | 6/2021 | Hird | G06F 21/606 |
| 2021/0286689 A1 * | 9/2021 | Dehganpour | G06F 11/3495 |
| 2021/0326221 A1 * | 10/2021 | Guim Bernat | G06F 11/0709 |
| 2022/0004468 A1 * | 1/2022 | Willhalm | G06F 21/60 |
| 2022/0100870 A1 * | 3/2022 | Matthews, Jr | G06F 21/6209 |
| 2023/0059382 A1 * | 2/2023 | Kim | G06F 12/1408 |
| 2023/0119255 A1 * | 4/2023 | Soubhi | G06F 15/7842 |
| | | | 713/193 |

* cited by examiner

*Primary Examiner* — Steven G Snyder
*Assistant Examiner* — Christopher A Daley
(74) *Attorney, Agent, or Firm* — Lance Kreisman; Peninsula Patent Group

(57) ABSTRACT

A multi-processor device is disclosed. The multi-processor device includes interface circuitry to receive requests from at least one host device. A primary processor is coupled to the interface circuitry to process the requests in the absence of a failure event associated with the primary processor. A secondary processor processes operations on behalf of the primary processor and selectively receives the requests from the interface circuitry based on detection of the failure event associated with the primary processor.

18 Claims, 5 Drawing Sheets

MULTI-PROCESSOR DEVICE WITH EXTERNAL INTERFACE FAILOVER

CROSS-REFERENCE TO RELATED APPLICATIONS

This application is a Non-Provisional that claims priority to U.S. Provisional Application No. 63/272,923 filed Oct. 28, 2021, entitled MULTI-PROCESSOR DEVICE WITH EXTERNAL INTERFACE FAILOVER, which is incorporated herein by reference in its entirety.

TECHNICAL FIELD

The disclosure herein relates to multi-processor devices, and related methods, systems and modules that employ such devices.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of multi-processor devices, methods, systems and associated integrated circuit devices are disclosed herein. One embodiment of a multi-processor device described herein includes interface circuitry to receive requests from at least one host device. A primary processor is coupled to the interface circuitry to process the requests in the absence of a failure event associated with the primary processor. A secondary processor processes operations on behalf of the primary processor and selectively receives the requests from the interface circuitry based on detection of the failure event associated with the primary processor. By providing the secondary processor with the ability to selectively receive requests from the interface circuitry, the secondary processor may be able to perform recovery operations via the interface circuitry to restore the primary processor to a normal operating mode in a situation where the detected failure event impacts the primary processor's ability to properly function.

Figure 1:
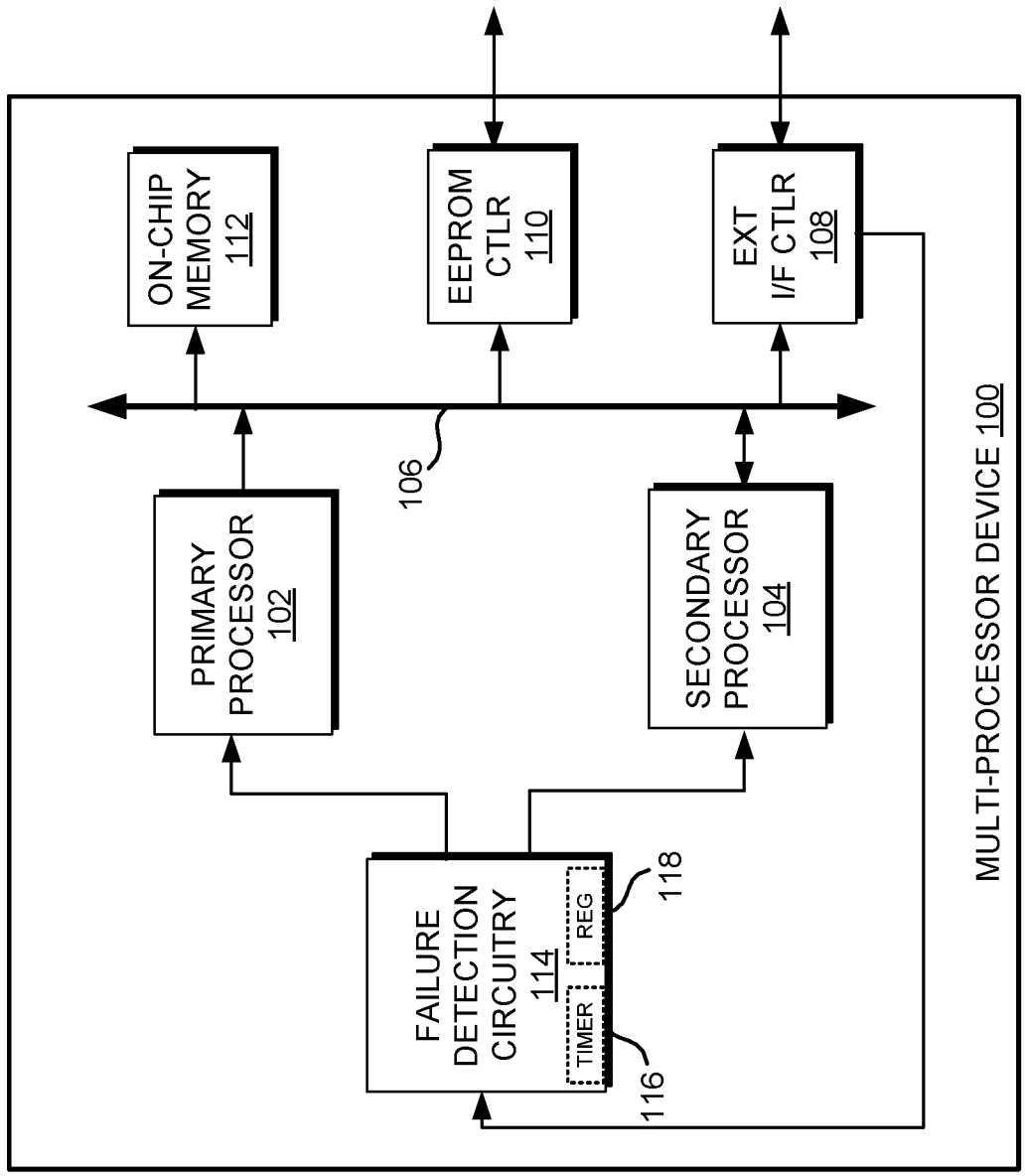
FIG. 1 illustrates one embodiment of a multi-processor device.

Referring now to FIG. 1, one embodiment of a multi-processor device, generally designated 100, includes a first processor 102 coupled to a second processor 104 via a bus 106. For one specific embodiment, the first processor 102 is configured as a primary or master processor responsible for overall control of the multi-processor device 100, while the second processor 104 is in the form of a secondary processor that operates on behalf of the primary processor 102. For some embodiments, the secondary processor 104 takes the form of a secure processor, such as a root of trust (RoT), to carry out cryptographic operations on behalf of the primary processor 102. Acting on behalf of the primary processor 102, the secure processor 104 may decrypt incoming requests, encrypt outgoing responses from the primary processor, perform attestation operations and other cryptographically-related tasks as the need arises. In some embodiments, the secure processor 104 is responsible for a secure boot process for the multi-processor device 100.

For one embodiment, the primary processor 102 and the secondary processor 104 take the form of processor cores disposed on a single integrated circuit (IC) die, or chip, forming a system-on-chip (SoC). In such an embodiment, the bus 106 may form one or more of an advanced extensible interface (AXI) for high-speed communications on-chip between the primary processor 102 and the secondary processor 104, and/or an advanced peripheral bus (APB) for low-speed control signals transferred on-chip between the processors. Other embodiments may employ separate processor chips disposed on a common substrate to form a chiplet, multi-chip module (MCM) or system-in-package (SIP). Yet other embodiments may employ an interconnected system of multiple packaged processors disposed on separate substrates.

Further referring to FIG. 1, the primary processor 102 generally controls all transfers of requests, data and/or messages dispatched between the multi-processor device 100 and a host (not shown) via an external interface 108. The requests may take the form of commands and/or interrupts alerting the processor to actions that need to be taken. For one embodiment, the external interface 108 at least partially takes the form of a serial management bus (SMBus), inter-integrated circuit (I2C), improved inter-integrated circuit (I3C), or similar chip communications interface. In certain embodiments, as explained more fully below with respect to FIG. 5, the external interface 108 may also include a high-bandwidth Compute Express Link (CXL) interface.

With continued reference to FIG. 1, for some embodiments, the multi-processor device 100 includes a memory controller 110 that interfaces with nonvolatile memory storage, such as electrically erasable programmable read only memory (EEPROM) that may be disposed on-chip or off-chip. For one embodiment, the nonvolatile memory stores firmware components for booting up the multi-processor device 100, and/or for retrieving updated firmware for performing restore operations on the primary processor 102 as more fully described below. On-chip processor memory 112 is also employed on the multi-processor device 100, which may be in the form of static random access memory (SRAM) for use by the primary processor 102 during a normal mode of operation. As explained further below, in some operating modes, the on-chip processor memory 112 may be accessible by the secure processor 104 to carry out recovery operations.

With continued reference to FIG. 1, one embodiment of the multi-processor device 100 includes failure detection circuitry 114 that generally monitors operation of the primary processor 102 to detect abnormal states or failure events associated with the primary processor 102 during the normal mode of operation. For some embodiments, the monitoring involves feeding information regarding received requests, such as interrupt signals, from the external interface 108 to the failure detection circuitry 114. As it receives the interrupt signals, one embodiment of the failure detection circuitry 114 tracks status information such as timeout indications generated by a timer circuit 116 that monitors incoming interrupts and expected execution latencies associated with the action associated with the asserted interrupt.

Other embodiments may employ register circuitry 118, such as a heartbeat status register that may be periodically updated by the primary processor 102 to indicate activity taken by the primary processor 102, and conversely to indicate unexpected inactivity on the part of the primary processor 102. Further, although FIG. 1 illustrates a separate circuit block for the failure detection circuitry 114, for some embodiments, circuitry may be included in whole or in part in the circuitry of the secondary processor 104 to perform one or more of the failure detection functions described above.

Figure 2:
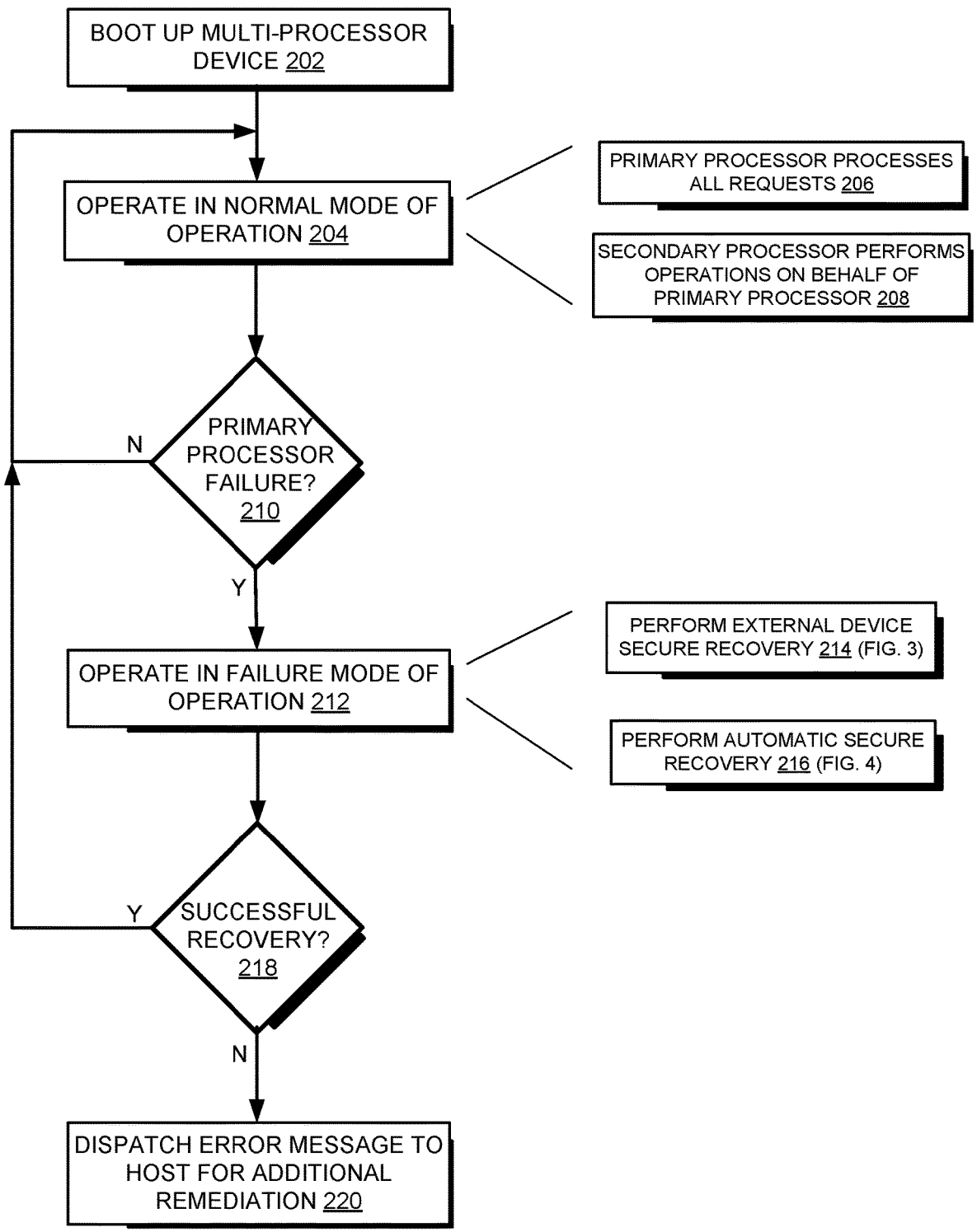
FIG. 2 illustrates a flowchart of steps for operating the multi-processor device of FIG. 1.

FIG. 2 illustrates a flowchart of steps for one specific embodiment of a method that may be performed to operate the multi-processor device 100 in a manner that provides failover protection in a scenario where the primary processor experiences a failure event. Generally, at any given time the multi-processor device 100 may operate in accordance with one of multiple modes of operation. During a start-up, or initialization mode of operation, at 202, the multi-processor device 100 undertakes steps to boot up and load operating system firmware into both processors 102 and 104 and perform all necessary initialization operations and configuration tasks to place the processors 102 and 104 in condition to interface with an external host (not shown). Once booted up and initialized, the multi-processor device 100 may execute anticipated operations on behalf of the host during a normal mode of operation, at 204. In the event of a detected failure event associated with the primary processor 102, the multi-processor device 100 operates in a failure mode of operation, at 212, to carry out recovery operations on the primary processor 102. Further details pertaining to each of the modes of operation are described below.

Further referring to FIG. 2, for one embodiment where the secondary processor 104 takes the form of a secure processor, the boot-up process 202 may be entirely controlled by the secure processor and may involve multiple boot stages. The multiple boot stages together act to (1) securely bring up the secure processor 104 from an initial firmware component that is internally-embedded into the circuitry of the secure processor (forming a "trust anchor"), (2) confirm a signature of additional firmware from memory for use in booting-up the primary processor 102, then (3) confirm an additional signature associated with the primary processor for loading the confirmed firmware. Depending on the application, more or fewer stages of secure boot sequences may be employed. Once the boot up process 202 is complete, operation of the multi-processor device 100 may pass from the initialization mode of operation to the normal mode of operation, at 204.

With continued reference to FIG. 2, for one embodiment, the normal mode of operation 204 involves an operating state where the primary processor 102 is configured (during the initialization mode of operation) as a "master" device to exclusively control and process all requests received from a host, at 206, and where the secondary processor 104 is configured (during the initial mode of operation) as a "minion" device to perform operations on behalf of the master device 102, at 208. During the normal mode of operation, the secondary processor 104, acting as a minion device, generally has no control over the external interface 108, and does not receive requests and/or messages directly from the host. Interrupts corresponding to commands and requests that are received from the host are monitored by the failure detection circuitry 114 during the normal mode of operation to ensure proper operation of the primary processor 102.

Further referring to FIG. 2, in a scenario where the failure detection circuitry 114 detects a failure event, at 210, such as by detecting a timeout indicator or a non-updated heartbeat register status, the multi-processor device 100 enters a failure mode of operation, at 212. Generally, the failure mode of operation places the secondary processor 104 in a configuration where it can perform recovery operations in an effort to restore the primary processor 102 to an expected normal operating state. For one embodiment, the secondary processor 104 cooperates with the host or other external device in performing an external device secure recovery process, at 214. In other embodiments, the secondary processor 104 may perform an automatic secure recovery process, at 216, as an alternative to the external device secure recovery method. In yet other embodiments, the secondary processor 104 may begin its recovery operations by first attempting the automatic secure recovery process, at 216, and if unsuccessful, additionally performing the external device secure recovery process, at 214. In any event, during the failure mode of operation, control of the external interface 108 reverts from the primary processor 102 to the secondary processor 104 in a failover configuration change.

Figure 3:
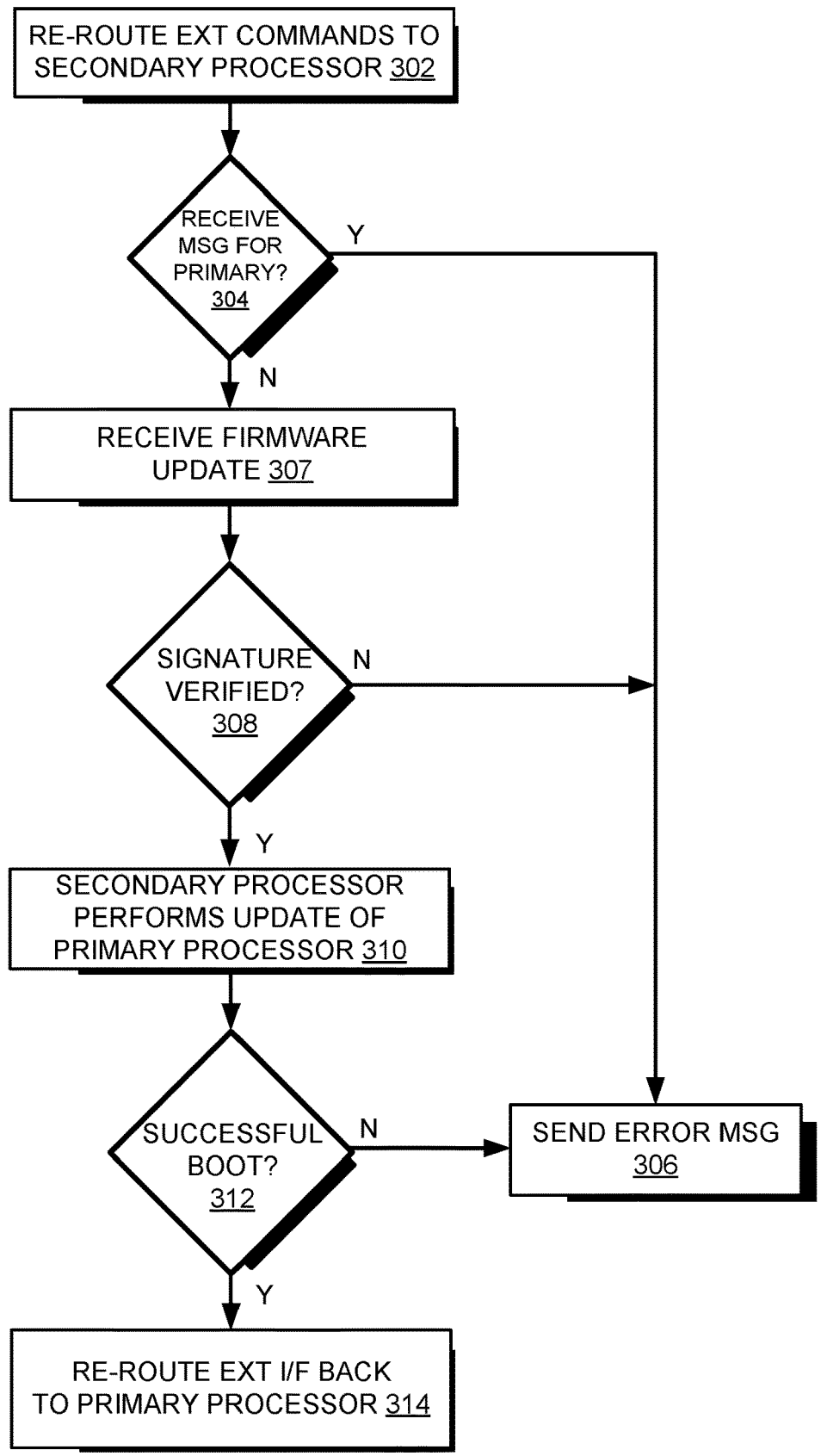
FIG. 3 illustrates steps for an external device recovery method for the failure mode of operation of FIG. 2.

Referring now to FIG. 3, in one specific embodiment, the external device secure recovery process involves first configuring the external interface 108 to re-route external commands from the host or another external device to the secondary processor 104 instead of the primary processor 102, at 302. While not shown, the failover configuration change to the external interface 108 may also involve bringing down or resetting all or a partitioned portion of the primary processor 102 so that it does not continue to operate in an unpredictable failure state. This may also include notifying the host that the multi-processor device 100 has entered the failure mode of operation. Should any message intended for the primary processor 102 be received by the secondary processor 104 following the failover reconfiguration of the external interface 108, such as at 304, the secondary processor 104 may send an error message back to the host, at 306, as a notification that the primary processor 102 is unable to receive the message.

Further referring to FIG. 3, with the external interface 108 reconfigured to allow the secondary processor 104 to receive requests directly from the external interface 108, the secondary processor 104 may then receive updated firmware from the host or another external device, at 307, for subsequent uploading to the primary processor 102. For embodiments where the secondary processor 104 takes the form of a secure processor, a cryptographic signature associated with the firmware may be verified at 308 using, for example, Pass Key Infrastructure (PKI) techniques or other cryptographic authentication processes.

Following verification of the signature associated with the received firmware, the secondary processor 104 performs an update of the primary processor 102, at 310, by booting up the primary processor 102 with the updated firmware as a substitute for any previous version of the firmware. This boot up sequence may be similar to the boot up process employed in the initialization mode of operation, and may include multiple stages of signature verifications to ensure trust throughout the multi-processor device 100. If the boot process is successful in recovering the primary processor 102, at 312, then the external interface 108 is reconfigured to directly interface with the primary processor 102 instead of the secondary processor 104, at 314, thus restoring the multi-processor device 100 back to the normal mode of operation, at 204 (FIG. 2). If the boot up is unsuccessful in restoring the primary processor 102, then an error message may be dispatched back to the host for additional remediation operations, at 220 (FIG. 2).

While not shown in FIG. 2, additional remediation operations may involve instructing the secondary processor 104 to access the on-chip processor memory 112 in an effort to read stored data or log files from the on-chip processor memory 112 and to send the retrieved information back to the host. In some circumstances, the retrieved information may provide "context" associated with operations that were in the process of being performed by the primary processor 102 at the time of failure. For applications where multiple hosts may be involved in transacting multiple threads of data with the multi-processor device 100, such context in the stored data may involve partial security key and/or other contextual information to aid in a failure analysis of the failure event. By understanding the context surrounding the primary processor failure, a targeted firmware solution to successfully restoring the primary processor 102 to normal operation may be implemented, significantly enhancing the probability for a successful recovery. Other remediation operations may involve recovering the context of one or more messages sent between the external entity/host and the primary processor 102 with the goal of being able to successfully allow the secondary processor 104 to respond to messages intended for the primary processor 102 with an error message. Recovering contextual information may also enable, for example, the secondary processor 104 to communicate over a secured (encrypted) Security Protocol and Data Model (SPDM) session originally between the external entity/host and the primary processor 102 thereby not having to create a new session when the secondary processor 104 takes over.

Figure 4:
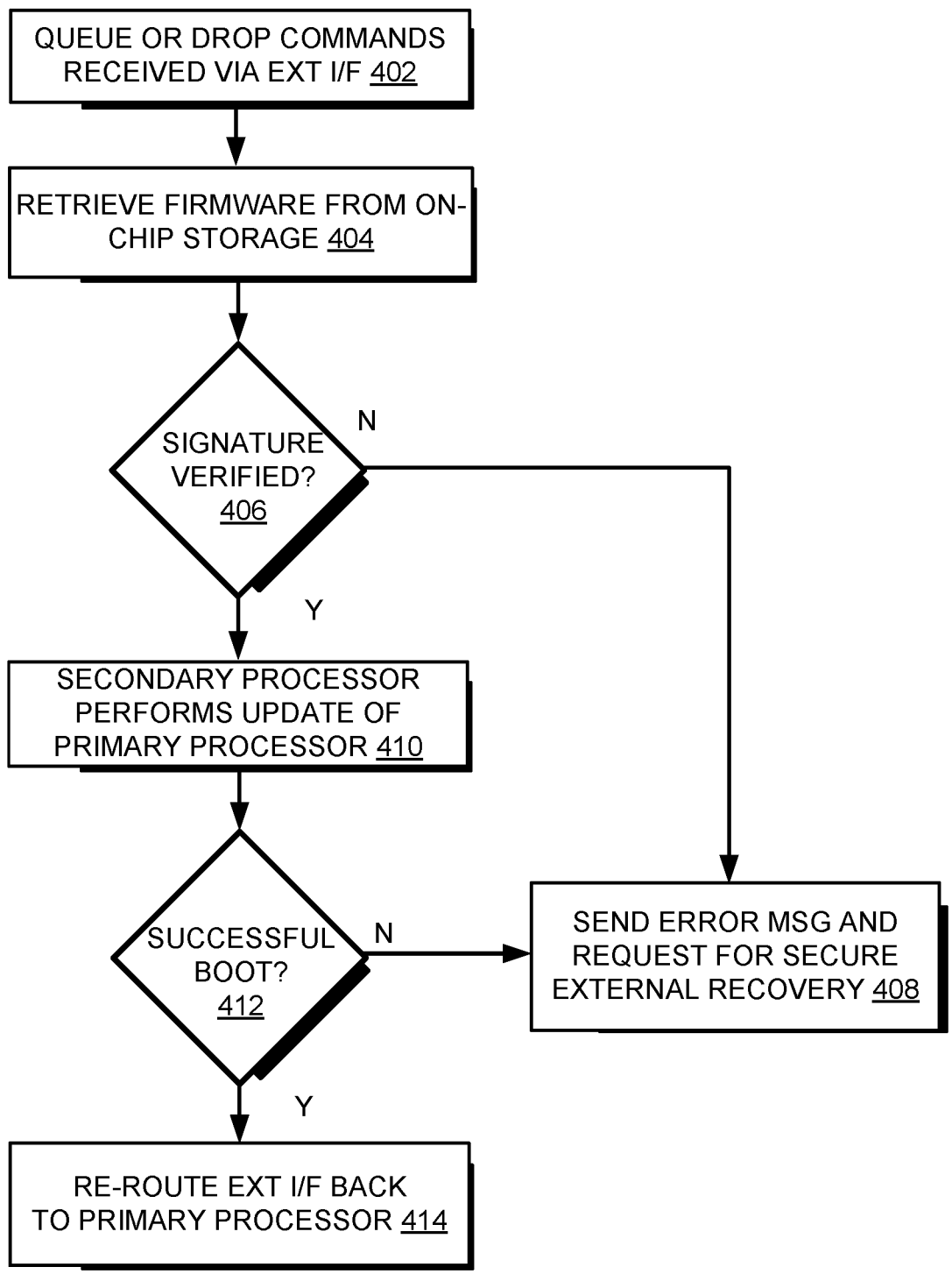
FIG. 4 illustrates steps for an automatic secure recovery method for the failure mode of operation of FIG. 2.

As noted above, while one embodiment for recovering the primary processor 102 involves an external device secure recovery process, an alternative method to recover the primary processor 102 during the failure mode of operation utilizes a self-recovery method in the form of an automatic secure recovery technique. Once again, as the multi-processor device 100 detects a failure event, at 210 (FIG. 2), and begins operation in the failure mode, at 212, the secondary processor 104 may begin to perform the automatic secure recovery sequence, at 216. FIG. 4 illustrates one embodiment of an automatic secure recovery sequence of steps to perform self-recovery of the primary processor 102 that corresponds to the sequence block 216. At 402, while operating in the failure mode, commands received via the external interface 108 are queued or dropped in response to instructions issued by the secondary processor 104. The secondary processor 104 then accesses on-chip storage, such as non-volatile storage, to retrieve firmware to boot up the primary processor 102, at 404. Once retrieved, a signature associated with the firmware is verified by the secondary processor 104, at 406, and if authenticated, then the secondary processor 104 loads the firmware to the primary processor 102 in a firmware update operation, at 410. If the boot up process is determined to be successful, at 412, then the external interface 108 is reconfigured to interact directly with the primary processor 102, at 414, and the primary processor reports to the host that it has been recovered. If the boot up process fails, then the secure processor 104 dispatches an error message to the host, such as at 408. For some embodiments, the host may then begin executing steps to carry out the external device secure recovery sequence described above as a supplemental recovery method.

For some embodiments, including those that employ a CXL external interface such as that described below with respect to FIG. 5, the automatic secure recovery technique provides a way to preserve operability of the CXL interface even during the failure mode of operation. In such a circumstance, separate reset zones may be configured for the multi-processor device 100 to allow for partial operability in one region of the multi-processor device 100, while allowing for partial resetting of other non-operating regions of the multi-processor device 100. Partitioning reset zones in this manner provides operational flexibility such that the primary processor 102 is not necessarily required for the CXL interface to successfully operate. As a result, recovery operations of the primary processor 102 may be carried out as background operations without affecting memory access operations that are being carried out over the CXL interface. For some embodiments, however, pausing of CXL-related command processing, log writing, and so forth may occur over the CXL interface during the failure mode of operation.

The multi-processor device 100 and the associated recovery methods described above lend themselves well to applications involving distributed processing with hardware-based security schemes. In the field of distributed memory processing, CXL Type 3 devices, such as CXL buffers, may exhibit significantly improved reliability through adoption of the multi-processor device structures and associated methods disclosed herein.

Figure 5:
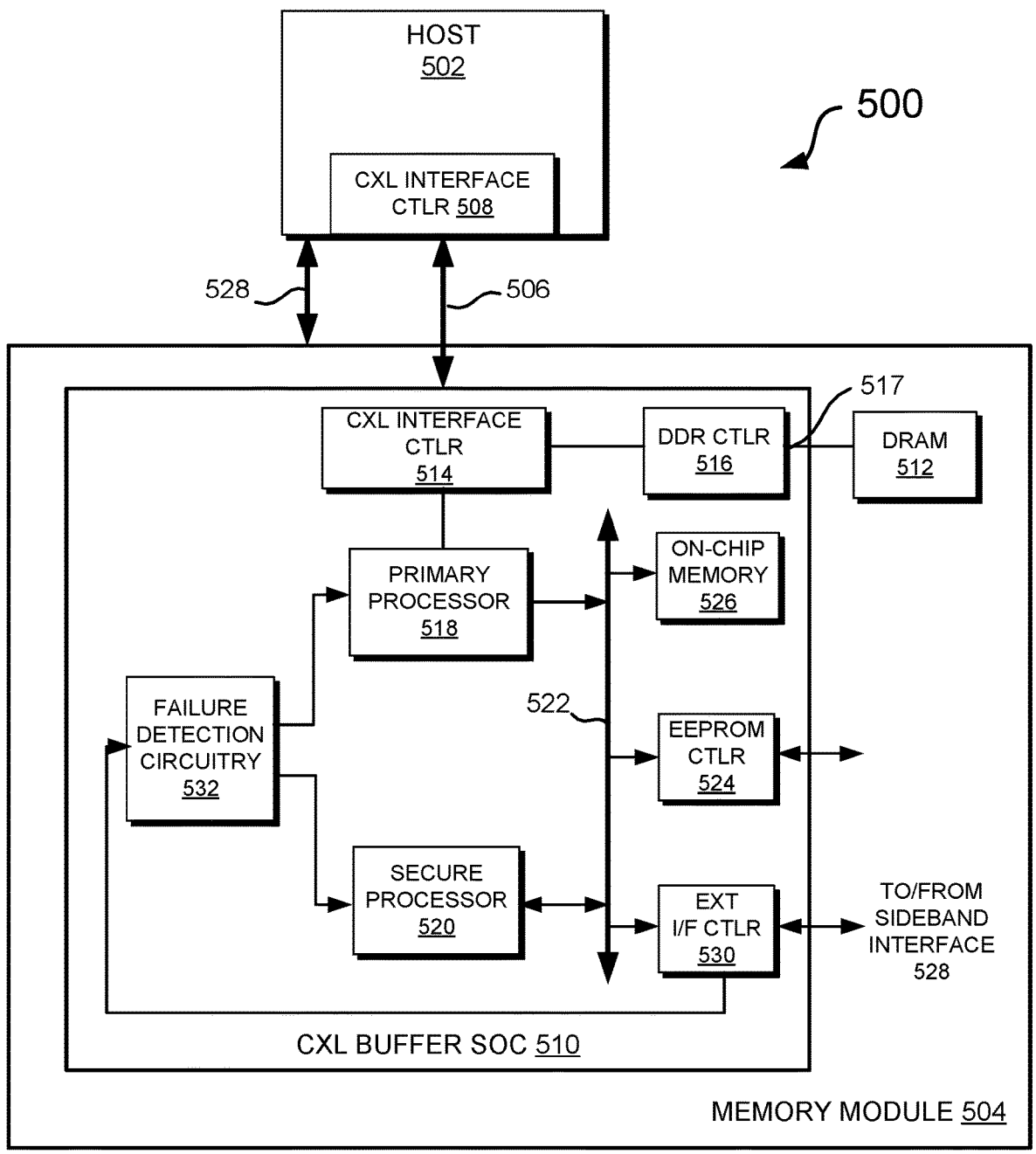
FIG. 5 illustrates one embodiment of a memory system employing a compute express link (CXL) buffer integrated circuit (IC) chip that is similar to the multi-processor device of FIG. 1.

FIG. 5 illustrates one specific embodiment of a memory system, generally designated 500, that employs a CXL Type 3 memory device in the form of a CXL buffer 510. The memory system 500 includes a host 502 that interfaces with a memory module 504 primarily through a CXL link 506. For one embodiment, the host includes a host CXL interface controller 508 for communicating over the CXL link 506 utilizing protocols consistent with the CXL standards, such as CXL.io and CXL.mem. For some embodiments that involve CXL Type 2 devices, an additional CXL.cache protocol may also be utilized.

Further referring to FIG. 5, the memory module 504 is configured to generally support the distributed CXL memory architecture, thus allowing one or more hosts to access system memory 512, such as volatile (DRAM) memory devices or non-volatile memory devices, via the CXL buffer 510. For one embodiment, the CXL buffer 510 takes the form of a system-on-chip (SOC) and includes any of the features described above with respect to the multi-processor device 100 (FIG. 1).

With continued reference to FIG. 5, one embodiment of the CXL buffer 510 employs a primary interface that includes an in-band CXL external interface controller 514 and module memory control circuitry 516. The in-band CXL external interface controller 514 and the memory controller 516 cooperate to provide a transfer path between the in-band CXL link 506 and the module memory 512. For one embodiment, the module memory control circuitry 516 includes a double data rate (DDR) memory controller to manage the DRAM module memory 512 via a secondary interface, at 517. A primary processor 518 is configured to solely control the memory control circuitry 516 during a normal mode of operation. In accordance with CXL standards, the primary processor 518 controls the in-band CXL interface 514, yet is prevented from directly accessing the module memory 512 in most circumstances to enhance security.

Acting on behalf of the primary processor 518, a secure processor 520 is coupled to the primary processor 518 via an internal system bus 522. As explained above with respect to the multi-processor device 100 (FIG. 1), the secure processor 520 may take the form of a hardware root of trust (RoT) to carry out cryptographic operations on behalf of the primary processor 518. For one CXL-related embodiment, the secure processor is responsible for encryption/decryption in hardware, as necessary, and may include storage to store cryptographic keys securely. The secure processor also participates in device attestation operations, confirming that a given device is what it says it is, through certificate verification and or other identity confirmation techniques. For some embodiments, the secure processor may exclusively control the secure boot flow for the CXL buffer 510. Thus, consistent with the boot-up flow described above with respect to FIGS. 2-4, every piece of firmware that loads is validated by an attached signature that is referenced or tied to a signature component or key that is physically written in the CXL buffer gate circuitry.

Similar to the multi-processor device 100 embodiment of FIG. 1, the CXL buffer 510 additionally includes nonvolatile memory controller 524 that interfaces with memory storage, such as EEPROM, to control the storage of firmware components used in booting up the CXL buffer 510, and/or for retrieving updated firmware for performing restore operations on the primary processor 518 as described above with respect to FIGS. 2-4. On-chip processor memory 526 is also employed on the CXL buffer 510, which may be in the form of static random access memory (SRAM) for use by the primary processor 518 during normal operation. As explained further below, in some operating modes, the on-chip processor memory 526 may be accessible by the secure processor 520 via the on-chip bus 522.

Further referring to FIG. 5, for one embodiment, communications between the host 502 and the memory module 504 are enhanced through the use of a side-band channel or link 528 that is independent of the CXL link 506. To support use of the side-band channel, the CXL buffer 510 employs additional external interface circuitry in the form of a side-band external interface controller 530, which may support link protocols such as SMBus, I2C and/or I3C to name but a few. Since operation of the in-band CXL interface 514 relies on the successful operation of the primary processor 518, use of the side-band link 528 during the failure mode of operation provides an auxiliary channel for the CXL buffer 510 (via the secure processor 520) to communicate with the host 502 in the event of a failure event associated with the primary processor 518. This does not impact use of the side-band link during the normal mode of operations which allows the host 502 to communicate with the CXL buffer 510 without interfering with CCXL-related signal transfers.

With continued reference to FIG. 5, one embodiment of the CXL buffer 510 includes failure detection circuitry 532 that generally monitors operation of the primary processor 518 in much the same way as the failure detection circuitry 114 of FIG. 1. Thus, for some embodiments, the monitoring involves feeding information regarding received requests, such as interrupt signals, from the CXL interface controller 514 and/or the side-band interface controller 530 to the failure detection circuitry 532. As it receives the interrupt signals, one embodiment of the failure detection circuitry 532 tracks status information such as timeout indications associated with a given interrupt assertion. Alternative embodiments may employ register circuitry such as a heartbeat status register that is periodically updated by the primary processor to indicate normal operation on the part of the primary processor. Like the embodiment of FIG. 1, circuitry may be included in the secure processor 520 to perform one or more of the failure detection functions described above to cooperate with or to act as a substitute for the failure detection circuitry 532.

The system 500 of FIG. 5 operates generally to allow for accesses to the module memory 512 by the host 502 in a secure manner. Central to the system operation is the CXL buffer 510 operation, since it has overall control of all module memory accesses and the responsibility of securing all memory transactions. As a more specific form of the multi-processor device 100, the CXL buffer 510 generally operates in much the same way as described above and illustrated in FIGS. 2-4, with slight variations to account for specific CXL protocols and associated circuitry.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A multi-processor integrated circuit (IC) chip, comprising:
    interface circuitry to receive requests from at least one host;
    a primary processor coupled to the interface circuitry during a normal mode of operation, the primary processor to process the requests received over the interface circuitry during the normal mode of operation;
    on-chip storage to store secure firmware associated with the primary processor;
    a secure processor to perform cryptographic operations on behalf of the primary processor during the normal mode of operation;
    failure detection circuitry coupled to the primary processor to detect a failure event associated with the primary processor and to initiate a failure mode of operation upon detection of the failure event;
    wherein the secure processor substitutes for the primary processor during the failure mode of operation to process the requests received by the interface circuitry; and
    wherein the secure processor automatically performs secure recovery operations on the primary processor upon initiation of the failure mode of operation including retrieving the secure firmware from the on-chip storage, and re-booting the primary processor using the secure firmware.

2. The multi-processor IC chip of claim 1, wherein the secure processor comprises:
    a hardware root-of-trust processor utilizing Public Key Infrastructure (PKI).

3. The multi-processor IC chip of claim 1, wherein the interface circuitry comprises:
    a compute express link (CXL) interface managed by the primary processor; and
    a sideband interface independent of the CXL interface.

4. The multi-processor IC chip of claim 1, wherein the secure processor is responsive to recovery commands from an external device to perform the secure recovery operations.

5. The multi-processor IC chip of claim 4, wherein the recovery commands are received via the interface circuitry.

6. The multi-processor IC chip of claim 1, wherein the failure detection circuitry is incorporated into the secure processor.

7. The multi-processor IC chip of claim 1, wherein the failure detection circuitry comprises:
    a timer circuit to detect timeout information indicative of a failure event.

8. The multi-processor IC chip of claim 1, wherein the failure detection circuitry comprises:
    a heartbeat status register to store a value that is periodically updated by the primary processor in the normal mode of operation.

9. A multi-processor device, comprising:
    interface circuitry to receive requests from at least one host device;
    a primary processor coupled to the interface circuitry to process the requests in an absence of a failure event associated with the primary processor;
    on-chip storage to store secure firmware associated with the primary processor;
    a secondary processor to process operations on behalf of the primary processor, the secondary processor to selectively receive the requests from the interface circuitry based on detection of the failure event associated with the primary processor; and
    wherein the secondary processor automatically performs secure recovery operations on the primary processor upon the detection of the failure event comprising retrieving the secure firmware from the on-chip storage, and re-booting the primary processor using the secure firmware.

10. The multi-processor device of claim 9, further comprising:
    failure detection circuitry coupled to the primary processor to detect the failure event.

11. The multi-processor device of claim 9, wherein the secondary processor comprises:
    a secure processor to perform cryptographic operations on the requests in the absence of the failure event associated with the primary processor.

12. The multi-processor device of claim 11, wherein the secure processor comprises:
    a hardware root-of-trust processor utilizing Public Key Infrastructure (PKI).

13. The multi-processor device of claim 9, wherein the interface circuitry comprises:
    a compute express link (CXL) interface managed by the primary processor; and
    a sideband interface independent of the CXL interface.

14. The multi-processor device of claim 9, wherein the multi-processor device is embodied as a single integrated circuit (IC) chip.

15. The multi-processor device of claim 14, wherein the single IC chip comprises:
    a CXL buffer chip.

16. A method of operation in a multi-processor device, the multi-processor device including an external interface, a primary processor, and a secondary processor, the method comprising:
    operating the multi-processor device in a normal mode of operation such that the primary processor processes requests received by the external interface, and the secondary processor processes operations on behalf of the primary processor;
    storing secure firmware associated with the primary processor in on-chip storage;
    detecting a failure event associated with the primary processor;

operating the multi-processor device in a failure mode of operation upon detecting the failure event such that the secondary processor processes requests received by the external interface; and automatically performing secure recovery operations on the primary processor upon detection of the failure event including retrieving the secure firmware from the on-chip storage, and re-booting the primary processor using the secure firmware.

17. The method of claim 16, wherein the performing recovery operations to recover the primary processor comprises:

resetting the primary processor; and
re-booting the primary processor.

18. The method of claim 17, wherein:

the performing recovery operations is carried out in response to commands from an external device.

* * * * *